United States Patent
Fukawatase et al.

(10) Patent No.: US 8,220,828 B2
(45) Date of Patent: Jul. 17, 2012

(54) COLUMN-MOUNTED KNEE AIRBAG DEVICE

(75) Inventors: Osamu Fukawatase, Nishikamo-gun (JP); Akiyoshi Sanada, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 316 days.

(21) Appl. No.: 12/530,677

(22) PCT Filed: Feb. 17, 2009

(86) PCT No.: PCT/JP2009/052638
§ 371 (c)(1),
(2), (4) Date: Sep. 10, 2009

(87) PCT Pub. No.: WO2009/113365
PCT Pub. Date: Sep. 17, 2009

(65) Prior Publication Data
US 2010/0295279 A1    Nov. 25, 2010

(30) Foreign Application Priority Data
Mar. 12, 2008 (JP) ................................. 2008-062662

(51) Int. Cl.
*B60R 21/206* (2011.01)
*B60R 21/231* (2011.01)
(52) U.S. Cl. ...................... 280/730.1; 280/753; 280/775
(58) Field of Classification Search ............... 280/728.2, 280/730.1, 731, 752, 753, 775; 74/493
See application file for complete search history.

(56) References Cited

U.S. PATENT DOCUMENTS

| | | | |
|---|---|---|---|
| 5,570,901 A | 11/1996 | Fyrainer | |
| 6,155,595 A * | 12/2000 | Schultz | 280/729 |
| 6,170,871 B1 * | 1/2001 | Goestenkors et al. | 280/743.1 |
| 6,299,200 B1 * | 10/2001 | Bowers et al. | 280/730.2 |
| 6,752,417 B2 * | 6/2004 | Takimoto et al. | 280/730.1 |
| 7,942,440 B2 * | 5/2011 | Choi | 280/740 |

(Continued)

FOREIGN PATENT DOCUMENTS
DE    102 50 405 A1    5/2003
(Continued)

OTHER PUBLICATIONS
Machine Translation of JP2007131082 A.*
(Continued)

*Primary Examiner* — Joseph Rocca
(74) *Attorney, Agent, or Firm* — Oliff & Berridge, PLC

(57) ABSTRACT

A column-mounted knee airbag device in which a knee airbag can be correctly deployed even when the position of a steering column has changed due to a telescopic function. The column-mounted knee airbag device is equipped with a knee airbag folded inside a column cover covering a steering column main body having a telescopic function, and an inflator that generates gas when a vehicle impact is detected or predicted. The knee airbag opens an airbag door of a column cover by deployment pressure when supplied with gas, and deploys between an instrument panel and the knees of a driver. Gas ejection holes that supply gas from the inflator to the knee airbag are disposed, when viewed from the side with the steering column in a state positioned furthest to the front due to a telescopic function, further to the rear than the instrument panel in the vehicle front-rear direction.

20 Claims, 9 Drawing Sheets

U.S. PATENT DOCUMENTS

| | | | |
|---|---|---|---|
| 2003/0001371 A1* | 1/2003 | Wackenroder et al. | 280/742 |
| 2003/0030255 A1* | 2/2003 | Igawa et al. | 280/730.1 |
| 2003/0120409 A1 | 6/2003 | Takimoto et al. | |
| 2005/0151352 A1* | 7/2005 | Abe et al. | 280/730.1 |
| 2007/0145730 A1* | 6/2007 | Choi | 280/740 |
| 2007/0182134 A1 | 8/2007 | Mizuno et al. | |
| 2007/0228701 A1* | 10/2007 | Yamamura | 280/730.2 |
| 2008/0100042 A1 | 5/2008 | Adachi et al. | |
| 2008/0106078 A1 | 5/2008 | Fukawatase et al. | |
| 2008/0111353 A1 | 5/2008 | Fukawatase et al. | |
| 2009/0058052 A1* | 3/2009 | Ford et al. | 280/730.1 |

FOREIGN PATENT DOCUMENTS

| | | |
|---|---|---|
| JP | A-8-301054 | 11/1996 |
| JP | A-9-104317 | 4/1997 |
| JP | A-2002-37003 | 2/2002 |
| JP | A-2003-226215 | 8/2003 |
| JP | A-2007-131082 | 5/2007 |
| JP | A-2007-203937 | 8/2007 |
| JP | A-2007-302063 | 11/2007 |
| JP | A-2008-87523 | 4/2008 |
| JP | A-2008-110704 | 5/2008 |
| JP | A-2008-114609 | 5/2008 |
| JP | A-2008-114701 | 5/2008 |
| JP | A-2008-120156 | 5/2008 |
| JP | A-2008-222111 | 9/2008 |
| WO | WO 2008/053664 A1 | 5/2008 |

OTHER PUBLICATIONS

Machine Translation of DE 10250405 A1.*

U.S. Appl. No. 12/447,601, filed Apr. 28, 2009 in the name of Fukawatase et al.

* cited by examiner

COLUMN-MOUNTED KNEE AIRBAG DEVICE

TECHNICAL FIELD

The present invention relates to a column-mounted knee airbag device.

RELATED ART

Occupant protection devices with a knee airbag module installed to a steering column cover are known (see, for example, Patent Document 1: Japanese Patent Application Laid-Open (JP-A) No. 9-104317 and Patent Document 2: JP-A No. 2002-37003).

DISCLOSURE OF THE INVENTION

Problem to be Solved by the Invention

However, techniques like those used in the above documents have not considered application to steering columns having a telescopic function.

In consideration of the above circumstances, an object of the present invention is to provide a column-mounted knee airbag device that can correctly deploy a knee airbag even when the position of a steering column has changed due to a telescopic function.

Method of Solving the Problem

A column-mounted knee airbag device according to a first aspect of the present invention includes: a knee airbag used for protecting the knees of a driver, the knee airbag being folded inside a column cover that covers a steering column having a telescopic function, the knee airbag opening an airbag door provided in the column cover by deployment pressure when supplied with gas and deploying between an instrument panel and the knees of the driver; an inflator installed at the inside of the column cover, the inflator being actuated and generating gas when a vehicle impact is detected or predicted, wherein a gas supply opening for supplying gas from the inflator to the airbag is disposed in a position further to the rear than the instrument panel in the vehicle front-rear direction, when viewed from the side with the steering column having a telescopic function in a state positioned furthest to the front in the vehicle front-rear direction.

According to the above aspect, gas is generated when the inflator is actuated when a vehicle frontal impact is detected or predicted, and this gas is supplied to the airbag through the gas supply opening. The knee airbag opens the airbag door by the deployment pressure as the knee airbag progressively deploys (inflates), and deploys outside the column cover between the instrument panel and the knees of the driver. Protection is thereby achieved of the knees of the driver.

With the present column-mounted knee airbag device, the gas supply opening is positioned to the rear of the instrument panel in the vehicle front-rear direction, namely on the driver knee side of the instrument panel, when the steering column is positioned furthest to the front in the vehicle front-rear direction (referred to below as the telescopic short state) by the telescopic function. Therefore, there are no occasions in the telescopic short state when the knee airbag (a portion thereof) initiates deployment at the inside of the instrument panel. The airbag can thereby be rapidly deployed in front of the knees of the driver (between the knees and the outside face of the instrument panel).

Consequently, in the column-mounted knee airbag device according to the above exemplary embodiment, the knee airbag can be correctly deployed even when the position of a steering column has changed due to a telescopic function.

The above aspect may be configured such that the gas supply opening is disposed inside the knee airbag such that gas is ejected the toward both sides in the vehicle width direction.

According to the above aspect, rapid deployment is readily made in front of the knees of the driver (between the knees and the outside face of the instrument panel).

The above aspects may be configured such that: the longitudinal direction of the inflator is along the vehicle front-rear direction; and the gas supply opening is a gas ejection hole at a rear end portion of the inflator in the vehicle front-rear direction, opening toward the vehicle width direction.

According to the above aspect the gas ejection hole, provided to the rear end portion of the inflator with longitudinal direction along the vehicle front-rear direction (substantially parallel to the steering column), is the gas supply opening for supplying gas to the knee airbag. Consequently, the knee airbag can be correctly deployed by means of a simple structure, even when the position of the steering column has changed due to a telescopic function.

The above aspects may be configured such that: the longitudinal direction of the inflator is along the vehicle front-rear direction and a gas ejection hole is provided at a front end side of the inflator in the vehicle front-rear direction; a diffuser for guiding gas from the gas ejection hole to the airbag is fixed to the inflator; and the gas supply opening is a gas supply hole at a rear end portion of the diffuser in the vehicle front-rear direction, opening toward the vehicle width direction.

According to the above aspect, the gas ejected from the gas ejection hole of the inflator passes inside the diffuser and is supplied from the gas ejection hole, provided as the gas supply opening at the rear portion of the diffuser, to the airbag. Since in the present column-mounted knee airbag device the gas ejection hole of the inflator is positioned at the front end side in the vehicle front-rear direction, the wiring connection side of the inflator can be disposed facing rearward in the vehicle front-rear direction, and connecting up the inflator becomes easy.

The above aspect may be configured such that the diffuser covers the inflator from an outer peripheral side so as to guide gas from the gas ejection hole to the gas supply hole through a space formed between the diffuser and an outer peripheral face of the inflator.

According to the above aspect, gas ejected from the gas ejection hole of the inflator and passing through the space formed between the outer peripheral face of the inflator and the diffuser is supplied to the knee airbag from the gas supply hole provided at the rear end portion of the diffuser.

The above aspect may be configured such that: the longitudinal direction of the inflator is along the vehicle front-rear direction, a gas ejection hole is opened in an outer peripheral face of the inflator and the inflator is covered from the outer peripheral side by a diffuser for guiding gas from the gas ejection hole to the knee airbag; and the gas supply openings are open ends formed at both sides in the vehicle width direction in a space between an inner peripheral face of the diffuser and the outer peripheral face of the inflator.

According to the above aspect the gas ejected from the gas ejection hole of the inflator passes through inside the diffuser, and is supplied into the knee airbag through the respective gas supply openings, which are the two open ends of the diffuser in the vehicle width direction.

The above aspect may be configured such that: the knee airbag has a pair of upper and lower straps for restricting the thickness of the knee airbag in the vehicle front-rear direction when in the deployed state; and the gas supply opening is disposed inside the knee airbag between the pair of straps so as to be in the vicinity of the upper strap of the pair of straps when the airbag is in the deployed state.

According to the above aspect, the deployed thickness, in the vehicle front-rear direction, of the knee airbag supplied with gas and deployed, is restricted by the pair of upper and lower straps. Since the opening supplying gas from the inflator in this deployed state is disposed in the vicinity of the upper strap, the upper portion of the knee airbag can be rapidly deployed.

Effect of the Invention

As explained above, the column-mounted knee airbag device according to the present invention has the excellent effect in that the knee airbag can be correctly deployed even when the position of a steering column has changed due to a telescopic function.

BEST MODE OF IMPLEMENTING THE INVENTION

Explanation will now be given of a column-mounted knee airbag device 10 according to a first exemplary embodiment of the present invention, with reference to FIG. 1 to FIG. 4. Note that the arrow FR, the arrow UP, and the arrow W shown for ease of reference in each of the drawings indicate the front direction (direction of progression), the upward direction, and the width direction of the vehicle to which the column-mounted knee airbag device 10 is applied. Explanation will first be given of the outline configuration of a steering column 12 to which the column-mounted knee airbag device 10 is applied, and explanation will then be given of the column-mounted knee airbag device 10 itself.

Configuration of the Steering Column Device

Figure 1:
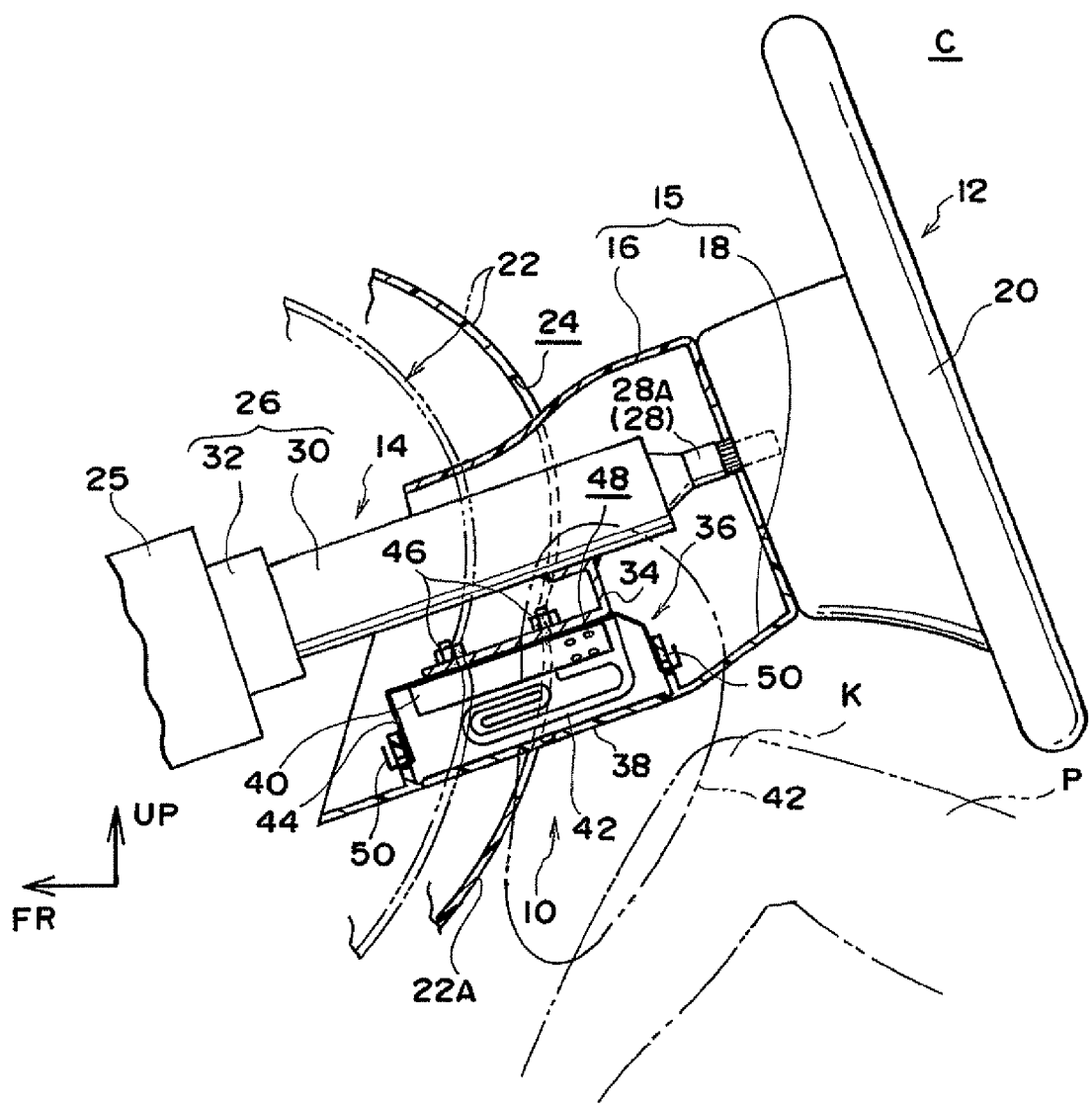
FIG. 1 is a partially cut-away side view showing a column-mounted knee airbag device according to a first exemplary embodiment of the present invention.

FIG. 1 shows the outline overall configuration of a steering column 12 in a partially cut-away side view. As shown in the figure, the steering column 12 is configured to include main portions of: a steering column main body 14 serving as the steering column of the present invention; a column cover 15, covering the rear end of the steering column main body 14 in the vehicle front-rear direction; and a steering wheel 20, disposed at a rear end portion of the steering column main body 14 in the vehicle front-rear direction.

The steering column 12 is inserted in a forward tilted state through an opening 24 formed in an instrument panel 22 so as to face toward the driver's seat. The steering column 12 is supported on instrument panel reinforcement (not shown in the figures), spanning across inside the instrument panel 22 between left and right front pillars, via a tilting and telescoping drive mechanism 25.

In the assembled state of the steering column 12 to the vehicle body, the column cover 15 is disposed in a state such that a portion at the front end of the column cover 15 is disposed inside the instrument panel 22, with the remaining portion of the column cover 15 protrudes out into the cabin C. The column cover 15 is of an upper and lower two part structure.

Specifically, the column cover 15 is configured in a cylindrical shape overall from a column upper cover 16 configuring the upper portion of the column cover 15 in the vehicle up-down direction and a column lower cover 18.

The steering column main body 14 is equipped with a column tube 26 forming a substantially circular cylindrical shape, with a steering main shaft 28 rotatably supported in an axial portion of the column tube 26. The steering main shaft 28 is divided in the column axial direction into two portions, with an upper side shaft 28A and a lower side shaft (not shown in the figures) connected together by a spline fitting. The upper side shaft 28A is therefore capable of relative displacement within a specific stroke range in the axial direction with respect to the lower side shaft, and is incapable of relative rotation thereto. The steering wheel 20, to which the driver applies a steering force, is fixed to a rear end portion of the upper shaft side 28A with a nut.

The column tube 26 covering the steering main shaft 28 is divided into two portions in the column axial direction (a double-tube structure), with an inner tube 30 disposed at the driver (steering wheel 20) side and an outer tube 32 disposed at the opposite side to that of the driver (the steering gear box side). The inner tube 30 and the outer tube 32 are connected together by a spline fitting. In the column tube 26 the internal diameter of the outer tube 32 is set bigger than the outer diameter of the inner tube 30. In the event, for example, of a secondary collision of the driver with the steering wheel 20, the column tube 26 is configured such that the inner tube 30 slides in the outer tube 32 and the column tube 26 collapses, so as to absorb energy from the secondary impact.

In the present exemplary embodiment the steering column 12 has an electrically operated, tilting and telescoping drive mechanism 25 disposed at a specific position on the column tube 26 of the steering column main body 14. The tilt mechanism of the tilting and telescoping drive mechanism 25 is a mechanism for adjusting the up-down position (height) of the steering wheel 20, by rotating the steering wheel 20 about a rotational axis along the vehicle width direction, a direction orthogonal to the column axial direction. The telescopic mechanism of the tilting and telescoping drive mechanism 25 is a mechanism for adjusting the position of the steering wheel 20 in the vehicle front-rear direction, by sliding the inner tube 30 with respect to the outer tube 32 (by extending or retracting the column tube 26) along their axial direction. Known mechanisms can be suitably adopted for the tilting and telescoping drive mechanism 25, and specific explanation of specific structures thereof will be omitted.

The instrument panel 22 shown by the solid line in FIG. 1 shows the relative position with respect to the position of the steering wheel 20 moved to the furthest position toward the front in the vehicle front-rear direction by the tilting and telescoping drive mechanism 25. The instrument panel 22 shown with the two-dot chain line shows the relative position with respect to the position of the steering wheel 20 moved to the furthest position toward the rear in the vehicle front-rear direction by the tilting and telescoping drive mechanism 25. The former state, namely the state with the steering wheel 20 positioned at the limit of movement forward relative to the instrument panel 22, will be referred to below as the telescopic short state.

Configuration of the Column-Mounted Knee Airbag Device

In the above steering column 12, the column-mounted knee airbag device 10 is disposed toward the rear end of the steering column main body 14 in the vehicle front-rear direction and below the steering column main body 14 in the vehicle up-down direction. The column-mounted knee airbag device 10 is actuated when a frontal impact of the vehicle is detected, or predicted. The column-mounted knee airbag device 10 is configured with main portions including: an airbag module 36 fixed through a bracket 34 below the inner tube 30; and an airbag door 38 formed in the column lower cover 18 configuring a lower portion of the column cover 15.

The airbag module 36 is equipped with, an inflator 40 that generates gas when actuated, and is also equipped with a knee airbag 42 that is inflated and deployed by gas supplied from the inflator 40, and a module case 44 accommodating these components. The inflator 40 is disposed substantially parallel to the steering column main body 14 so that the longitudinal direction of the inflator 40 is along the vehicle front-rear direction when seen in plan view. The inflator 40 is fixed to the module case 44 and to the bracket 34 using fastening means 46, formed from stud bolts and nuts. The airbag module 36 is thereby fixed with respect to the inner tube 30 of the steering column main body 14 in the manner stated above, and follows the telescopic operation of the steering wheel 20.

The module case 44 in this state is latched to front and rear ribs 50 provided to both end portions of the column lower cover 18 in the vehicle front-rear direction, and accommodates the inflator 40 and the knee airbag 42 below the inner tube 30. The module case 44 may, for example, be configured from a cloth material or the like that is both flexible and soft, or may be configured so as to be relatively rigid, such as from a metal or the like.

Gas ejection holes 48 are formed in a rear end portion, in the vehicle front-rear direction, of the inflator 40 that is fixed to the inner tube 30. The gas ejection holes 48 are provided respectively at both sides, in the vehicle width direction, of the rear portion of the inflator 40 that gas generated by the inflator 40 is ejected out toward both sides in the vehicle width direction.

As shown in FIG. 1, the inflator 40 is disposed so that, in the telescopic short state, the gas ejection holes 48 are positioned in the vehicle front-rear direction at the rear side of a vehicle front-rear direction rearward-facing decorative surface 22A of the instrument panel 22 (the opposite face of the instrument panel 22 to that facing the knee airbag 42). Namely, the gas ejection holes 48 are configured so as to always be positioned in the vehicle front-rear direction further to the rear than the decorative surface 22A, independent of the front-rear positioning of the steering wheel 20.

The knee airbag 42 is configured to accommodate at least a portion of the inflator 40 that includes the location formed with the gas ejection holes 48, such that the knee airbag 42 inflates and deploys when gas from the inflator 40 is supplied out from the gas ejection holes 48. The gas ejection holes 48 therefore correspond to the gas supply openings of the present invention. Prior to actuation of the column-mounted knee airbag device 10, the knee airbag 42 is disposed in a folded state inside the module case 44 between the column lower cover 18 and the bracket 34. The knee airbag 42 is folded, for example, with bellows folding, roll folding, cactus folding, or a combination using at least some of these.

When in receipt of gas supplied from the inflator 40, the knee airbag 42 deploys between the decorative surface 22A of the instrument panel 22 and both knees K of the driver P, as shown by the two-dot chain line in FIG. 1, protecting both knees K thereby. Namely, the knee airbag 42 is configured so as to arrest both knees K (suppress forward movement thereof) while supported with the decorative surface 22A of the instrument panel 22 acting as a reaction surface.

Figure 2A:
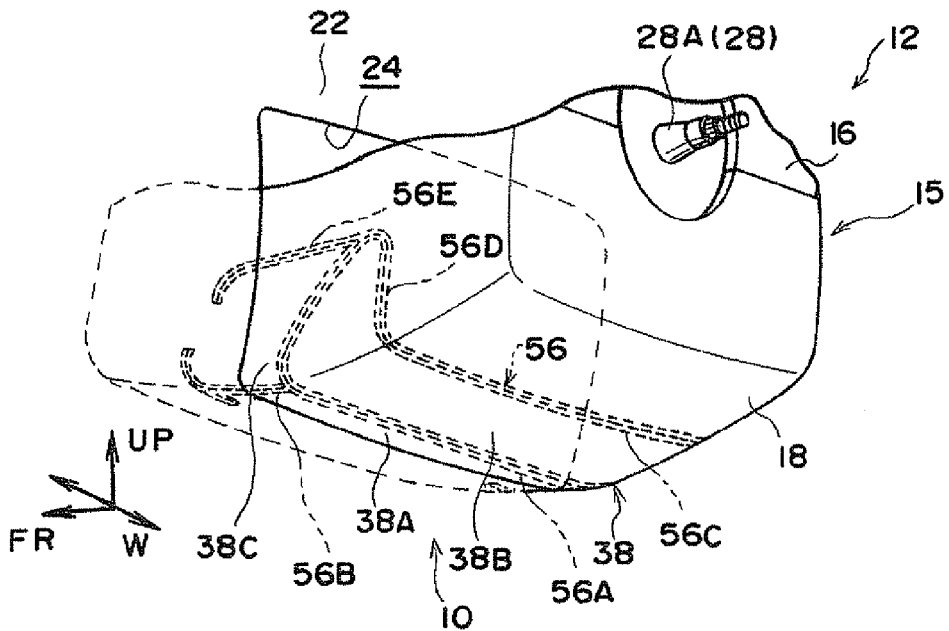
FIG. 2A is perspective view showing an airbag door of a column-mounted knee airbag device according to the first exemplary embodiment of the present invention, as seen prior to deployment.
Figure 2B:
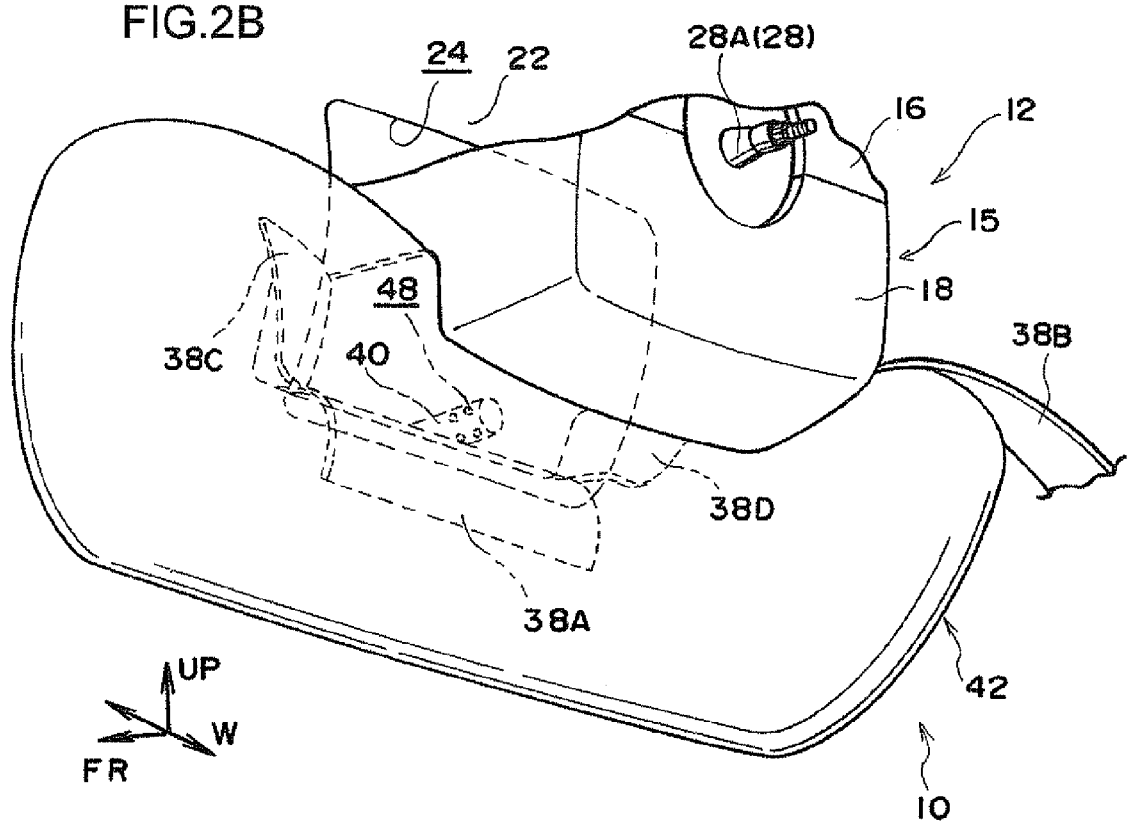
FIG. 2B is perspective view showing an airbag door of a column-mounted knee airbag device according to the first exemplary embodiment of the present invention, as seen in the deployed state.
Figure 3:
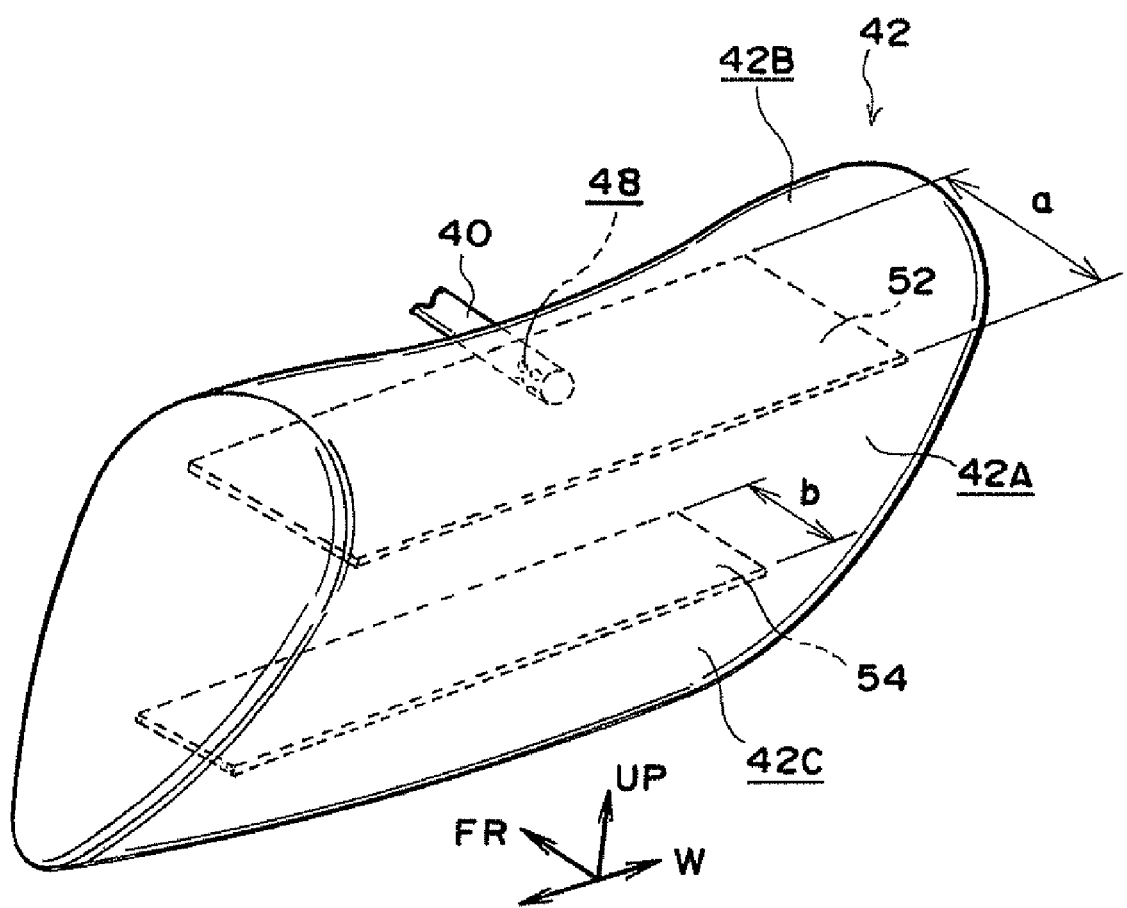
FIG. 3 is perspective view showing a knee airbag, in a deployed state, of the column-mounted knee airbag device according to the first exemplary embodiment of the present invention.

Furthermore, with respect to the deployed state of the knee airbag 42, the deployed state is such that the knee airbag 42 is deployed as shown in FIG. 2B and FIG. 3. Specifically, as shown in FIG. 3, a pair of upper and lower straps, i.e., an upper strap 52 and a lower strap 54, are provided internally to the knee airbag 42 so as to be deployed separated from each other in the vehicle up-down direction. The upper strap 52 and the lower strap 54 are each configured from a cloth material formed in a substantially rectangular shape with the longitudinal direction thereof along the vehicle width direction when seen in plan view. A width a of the upper strap 52 along the vehicle front-rear direction is greater than a width b of the lower strap 54 along the vehicle front-rear direction (a>b). The knee airbag 42 is thereby configured, as shown in FIG. 1 and FIG. 3, so as to have a thickness in the vehicle front-rear direction in the deployed state that is greater at the upper portion than at the lower portion of the knee airbag 42.

Figure 4:
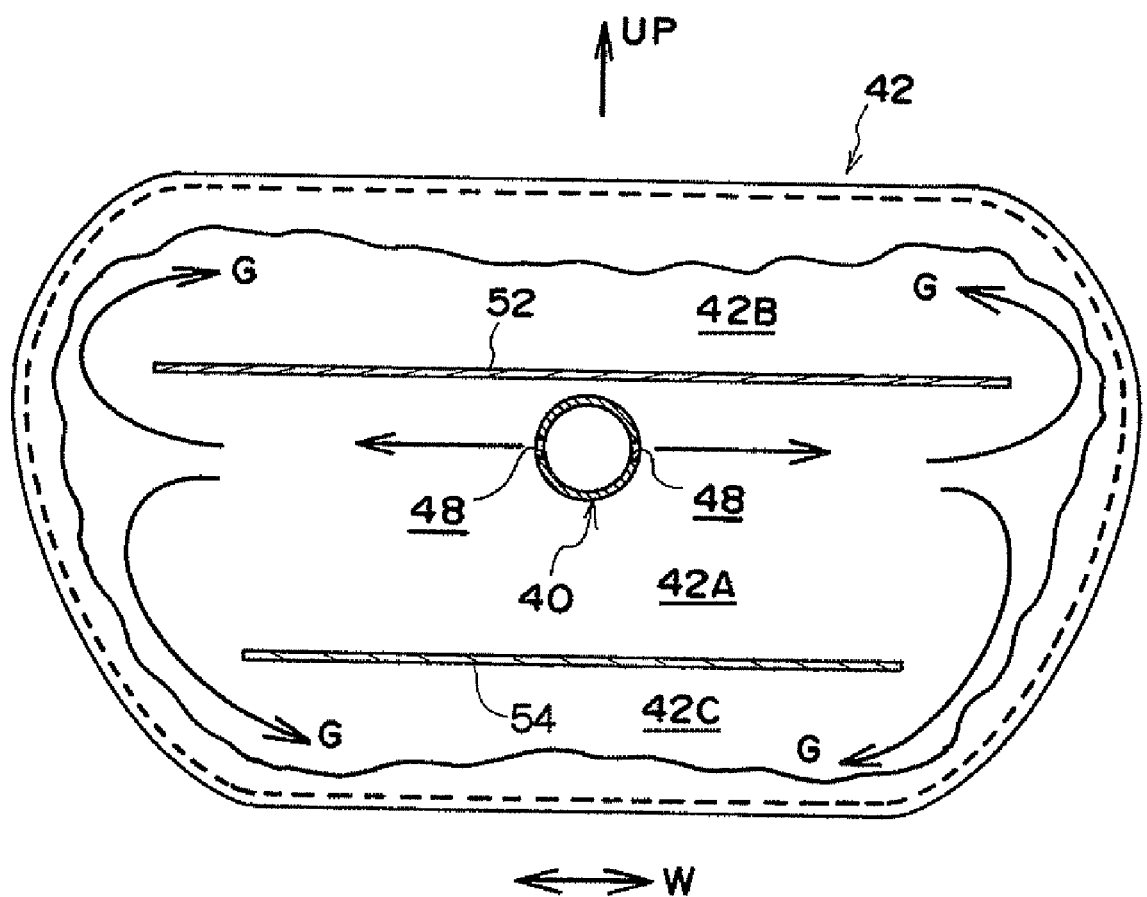
FIG. 4 is a partially cut-away back view showing a knee airbag, in a deployed state, of the column-mounted knee airbag device according to the first exemplary embodiment of the present invention.

In the column-mounted knee airbag device 10, as shown in FIG. 4, in the deployed state of the knee airbag 42 (the completely deployed state without load applied thereto) the inflator 40 (the gas ejection holes 48) is positioned in the knee airbag 42 within a central bag portion 42A between the upper strap 52 and the lower strap 54. In this state the gas ejection holes 48 of the inflator 40 are disposed in the central bag portion 42A of the deployed state knee airbag 42 so as to be positioned more in the vicinity of the upper strap 52 than the lower strap 54.

An upper bag portion 42B forming a portion above the central bag portion 42A of the knee airbag 42, and a lower bag portion 42C forming a portion below the central bag portion 42A are, as shown in arrow G of FIG. 4, supplied by gas that passes around the end portions in the longitudinal direction of the upper strap 52 and the lower strap 54, so as to be inflated and deployed thereby. The knee airbag 42 according to the present exemplary embodiment is configured such that the length along the vehicle width direction at the upper bag portion 42B side is shorter than at the lower bag portion 42C side when viewed from the rear.

As shown in FIG. 2A, specific tear lines 56 are provided to the airbag door 38 on the inside of the column lower cover 18, so as to break when the bag inflation pressure is of a specific amount or greater, opening the airbag door 38. In the present exemplary embodiment the tear lines 56 are formed as thinned portions of groove shaped recesses.

In further explanation of the airbag door 38 according to the present exemplary embodiment, the airbag door 38 includes a front door portion 38A, a rear door portion 38B, a left door portion 38C, and a right door portion 38D, as shown in FIG. 2B. The front door portion 38A has edges of substantially a U-shape, as shown in FIG. 2A, formed by the tear lines 56 which include a first vehicle width line 56A fowled along the vehicle width direction at a bottom wall portion of the column lower cover 18, and a pair of bottom front-rear lines 56B that each extend respectively frontward from the two ends of the first vehicle width line 56A. The front door portion 38A hinges with a portion at the front end of the pair of bottom front-rear lines 56B acting as the hinge portion, so as to open by folding back toward the front below the column lower cover 18, as shown in FIG. 2B. The rear door portion 38B, as shown in FIG. 2A, has the first vehicle width line 56A, a second vehicle width line 56C formed substantially parallel to, and at the rear of the first vehicle width line 56A, and a side inverted-U-shaped line 56D formed in the left wall of the column lower cover 18 and connecting between the left ends of the first vehicle width line 56A and the second vehicle width line 56C. The rear door portion 38B has an edge portion surrounded by a non-illustrated right line that is formed in the right had wall extending substantially parallel to and above the right ends of the first vehicle width line 56A and the second vehicle width line 56C. The rear door portion 3813 opens so as to fold back to toward the right and top, as shown in FIG. 2B. The left door portion 38C, as shown in FIG. 2A, is formed in substantially a U-shape surrounded by edge portions of the bottom front-rear line 56B on the left, a top line 56E that is formed in a portion of the left wall of the column lower cover 18 substantially parallel to the bottom front-rear line 5613 on the left, and the side inverted-U-shaped line 56D. The left door portion 38C opens with a portion between the front ends of the bottom front-rear lines 5613 and the top line 56E acting as a hinge portion, so as to open by folding forward at the left outside of the column lower cover 18, as shown in FIG. 2B. The right door portion 38D, while details of the tear lines 56 are not shown in the drawing, is formed so as to be left-right symmetrical to the left door portion 38C, and so as to open by folding forward at the right outside of the column lower cover 18, as shown in FIG. 2B.

The airbag door 38, as explained above, is provided with at least the rear door portion 38B (the first vehicle width line 56A, the side inverted-U-shaped line 56D) provided in a position further to the rear than the decorative surface 22A of the instrument panel 22 when in the telescopic short state. For any portions of the airbag door 38 that may be positioned further to the front in the vehicle front-rear direction than the decorative surface 22A, during the opening process the portion of the airbag door 38 that contacts the edge portion of the opening 24 acts in place of the above hinge portions, so as to open.

In the column-mounted knee airbag device 10, the inflator 40 actuation timing is controlled through an airbag ECU as a non-illustrated control means. The airbag ECU is configured, for example, so as to actuate the inflator 40 when a vehicle frontal impact is detected, or predicted, for a vehicle to which the column-mounted knee airbag device 10 has been applied, based on a signal from an frontal impact sensor.

Explanation will now be given of the operation of the first exemplary embodiment.

In the column-mounted knee airbag device 10 configured as described above, the airbag ECU that, based on a signal from an impact sensor, has detected, or predicted, a frontal impact of the vehicle to which the column-mounted knee airbag device 10 has been applied, actuates the inflator 40. When this occurs a large volume of gas is generated by the inflator 40, and this gas is ejected in a vehicle width direction from the gas ejection holes 48 of the inflator 40 and supplied into the knee airbag 42. The knee airbag 42 is inflated and deployed thereby, and when the deployment pressure of the knee airbag 42 acting on the airbag door 38 reaches a specific value, the column lower cover 18 breaks along the tear lines 56 as shown in FIG. 2B, and the airbag door 38 opens.

The knee airbag 42 inflates and deploys toward both sides in the vehicle width direction (substantially along the decorative surface 22A of the instrument panel 22) below the steering column 12 in the vehicle up-down direction. The inflated and deployed knee airbag 42 thereby arrests and protects both knees K, with the knee airbag 42 interposed between the decorative surface 22A (reaction surface) of the instrument panel 22 and both knees K of the driver P.

In the telescopic short state of the column-mounted knee airbag device 10, the gas ejection holes 48 of the inflator 40 are positioned to the rear side in the vehicle front-rear direction with respect to the decorative surface 22A of the instrument panel 22. In the present column-mounted knee airbag device 10, gas can therefore be supplied to the knee airbag 42 at the rear side (knee K side) with respect to the decorative surface 22A of the instrument panel 22. Thereby, deployment initiation does not occur when the knee airbag 42 (a portion thereof) is at the inside of the instrument panel when the column-mounted knee airbag device 10 is actuated in the telescopic short state. Consequently, the knee airbag 42 can be rapidly deployed in front of the knees of the driver (between the knees K and the decorative surface 22A of the instrument panel 22).

In this manner, in the column-mounted knee airbag device 10 according to the first exemplary embodiment, the knee airbag 42 can be appropriately deployed even if the forward-rear position of the inner tube 30 of the column tube 26 has changed due to the telescopic function. In other words, the present column-mounted knee airbag device 10 can be appropriately deployed independently of changes in the front-rear position of the airbag module 36 due to the tilting and telescoping drive mechanism 25.

In the column-mounted knee airbag device 10, the gas ejection holes 48 are also provided at a rear end portion in the vehicle front-rear direction of the inflator 40 that has its longitudinal direction along the vehicle front-rear direction. A configuration in which the gas ejection holes 48 are disposed to the rear side in the vehicle front-rear direction of the decorative surface 22A, even when in the telescopic short state, can therefore be realized using a simple structure. The inflator 40 that has its longitudinal direction along the vehicle front-rear direction, i.e. is longitudinally mounted, has the merit that when applied to a steering column 12 that is short in the vehicle front-rear direction, the inflator 40 can be disposed so as to have no interference with non-illustrated steering lock devices or the like.

In addition, the column-mounted knee airbag device 10 is configured with the gas ejection holes 48 positioned in the central bag portion 42A of the knee airbag 42 so as to be more in the vicinity of the upper strap 52 than in the vicinity of the lower strap 54. Consequently, more rapid deployment can be made of the top portion of the knee airbag 42 deployed in front of the knees K of an average framed driver or a large framed driver.

Other Exemplary Embodiments

Explanation will now be given of other exemplary embodiments of the present invention. Components and portions that are fundamentally the same as the above first exemplary embodiment or a aforementioned configuration are allocated the same reference numerals as those of the first exemplary embodiment or the aforementioned configuration, and explanation and illustration thereof is sometimes omitted.

Second Exemplary Embodiment

Figure 5:
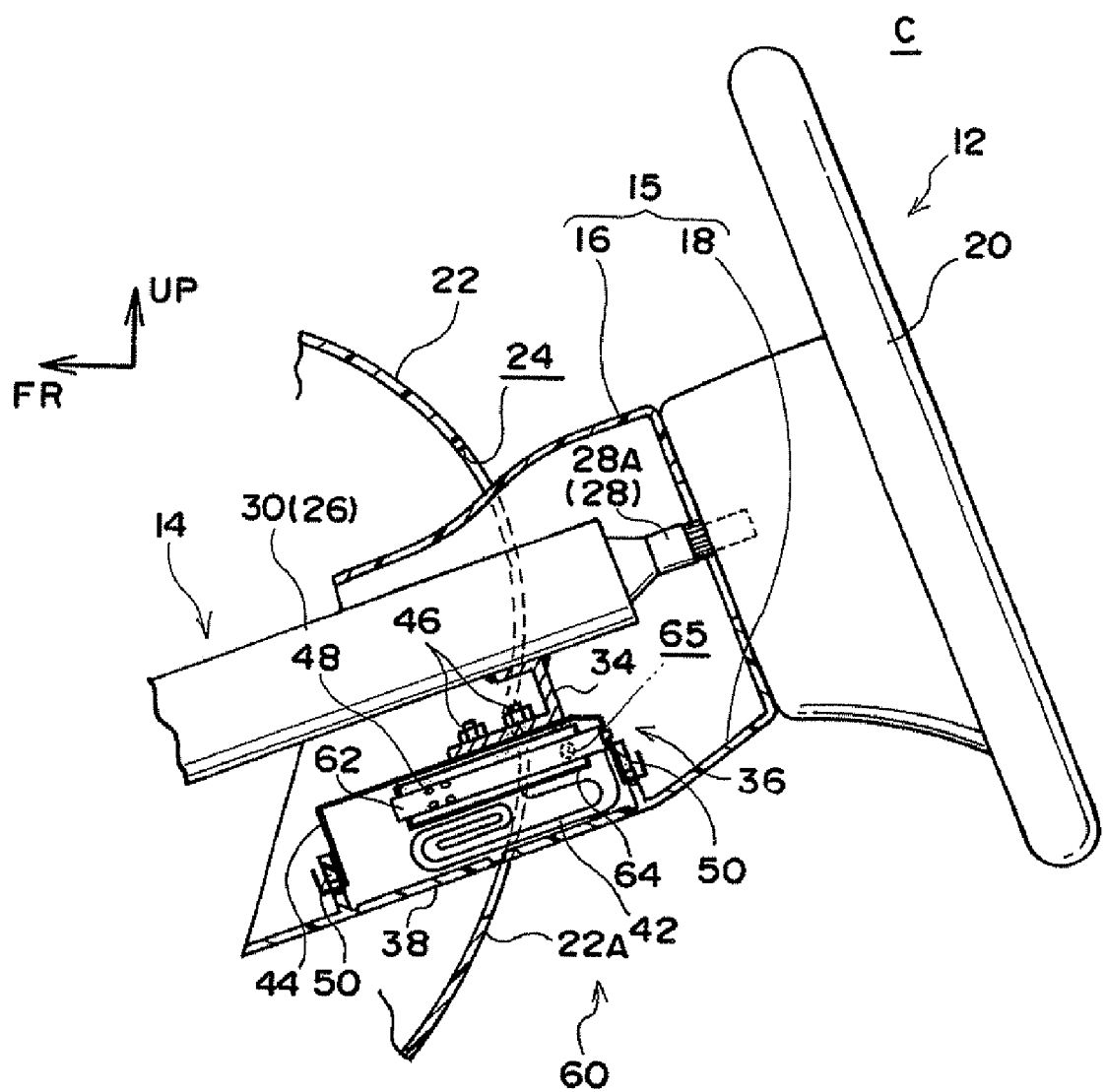
FIG. 5 is a partially cut-away side view showing a column-mounted knee airbag device according to a second exemplary embodiment of the present invention.

A column-mounted knee airbag device 60 according to a second exemplary embodiment is shown as a partially cut-away side view in FIG. 5. As shown in this figure, the column-mounted knee airbag device 60 differs from the column-mounted knee airbag device 10 of the first exemplary embodiment in being equipped with an inflator 62 that is provided with gas ejection holes 48 at a front end portion, instead of the inflator 40 provided with gas ejection holes 48 at a rear end portion.

Figure 6:
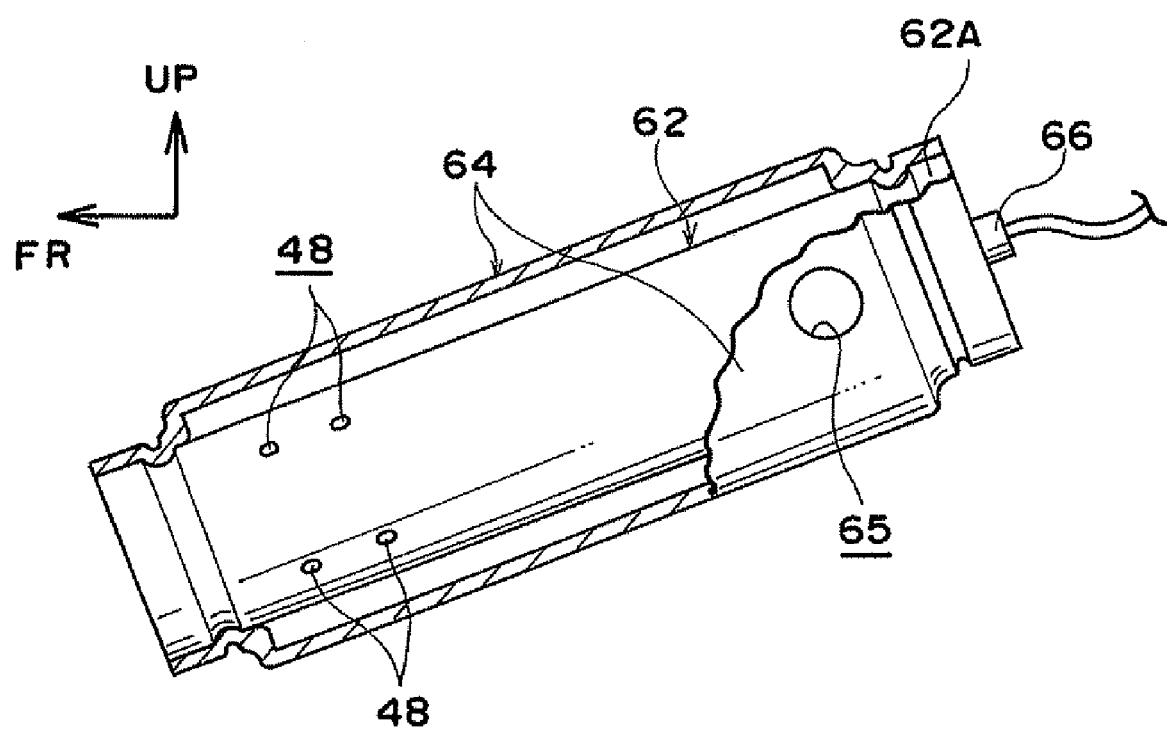
FIG. 6 is a partially cut-away side view showing an inflator and a diffuser of a column-mounted knee airbag device according to the second exemplary embodiment of the present invention.

Specifically, as shown in FIG. 6, the outer peripheral side of a portion of the inflator 62, including the locations disposed with the gas ejection holes 48 opened in the outer peripheral face of the inflator 62, is covered by a diffuser 64 serving as a flow adjusting member formed in a cylindrical shape. The inflator 62 and the diffuser 64 are fixed together in a gas sealed state at a portion at the front end in the vehicle front-rear direction (further forward than the gas ejection holes 48), and at a portion at the rear end in the vehicle front-rear direction, such that there is a gas path formed therebetween. In the column-mounted knee airbag device 60, gas supply holes 65 are formed as gas supply openings in the vicinity of the rear end of the diffuser 64, namely directly in front of portion that is fixed to inflator 62 at the rear side of the diffuser 64.

The gas supply holes 65 are formed at both sides of the diffuser 64 in the vehicle width direction so as to face in the vehicle width direction. Namely, in the column-mounted knee airbag device 60 the gas of the inflator 62 ejected from the gas ejection holes 48 is guided by the diffuser 64 (between the diffuser 64 and the inflator 62) to reach a portion at the rear in the vehicle front-rear direction, such that gas is ejected out to both sides in the vehicle width direction from the gas supply holes 65 at the left and the right.

The knee airbag 42 accommodates at least the portion of the diffuser 64 including the forming locations of the gas supply holes 65, such that the knee airbag 42 is supplied by the inflator 62 with gas from the gas supply holes 65, and thereby inflated and deployed. Consequently, the gas supply holes 65 correspond to the gas supply openings of the present invention. Non-illustrated stud bolts configuring a fastening means 46 are provide to the diffuser 64. The other parts of the configuration of the column-mounted knee airbag device 60 are the same as the corresponding parts of the configuration of the column-mounted knee airbag device 10.

Consequently, fundamentally the same effects can also be obtained with the column-mounted knee airbag device 60 according to the second exemplary embodiment, by operation in a similar manner to that of the column-mounted knee airbag device 10 according to the first exemplary embodiment.

In addition, in the column-mounted knee airbag device 60, since the inflator 62 can be disposed such that the position of the gas ejection holes 48 are at the front end side of the inflator 62 in the vehicle front-rear direction, as shown in FIG. 6, a connector portion that is the wiring connection portion of the inflator 62, can be positioned at the rear end of the inflator 62 in the vehicle front-rear direction. Therefore, in the column-mounted knee airbag device 60, when performing a wiring connection operation of the inflator 62, an opposing connector 66 is simply inserted into a connector portion 62A of the inflator 62 facing toward the cabin C, and the wiring connection operation is easy. Also, for example, sometimes configuration is made with the connector portion 62A positioned at the front side in the vehicle front-rear direction, with sub-wiring extending toward the rear from the connector portion 62A of the inflator 62 employed in order to improve productivity of the connecting operation. In the column-mounted knee airbag device 60, such sub-wiring can be made unnecessary (the wiring connection operation can be made easy without reliance on sub-wiring).

Third Exemplary Embodiment

Figure 7:
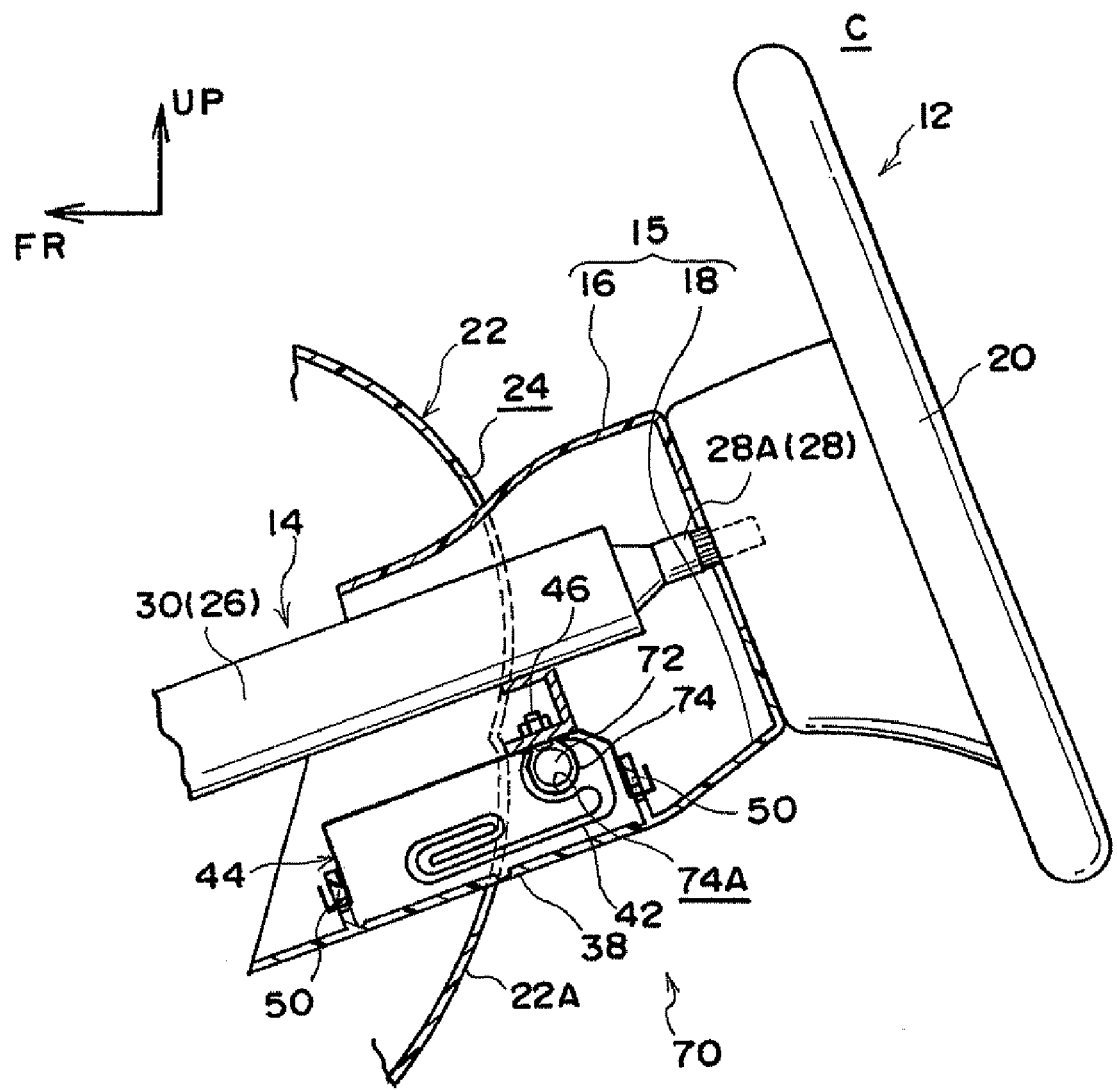
FIG. 7 is a partially cut-away side view showing a column-mounted knee airbag device according to a third exemplary embodiment of the present invention.

A column-mounted knee airbag device 70 according to a third exemplary embodiment of the present invention is shown as a partially cut-away side view in FIG. 7. As shown in the figure, the column-mounted knee airbag device 70 differs from the column-mounted knee airbag device 10 of the first exemplary embodiment in being equipped with an inflator 72 with longitudinal direction along the vehicle width direction, instead of the inflator 40 having its longitudinal direction along the vehicle front-rear direction.

Figure 8A:
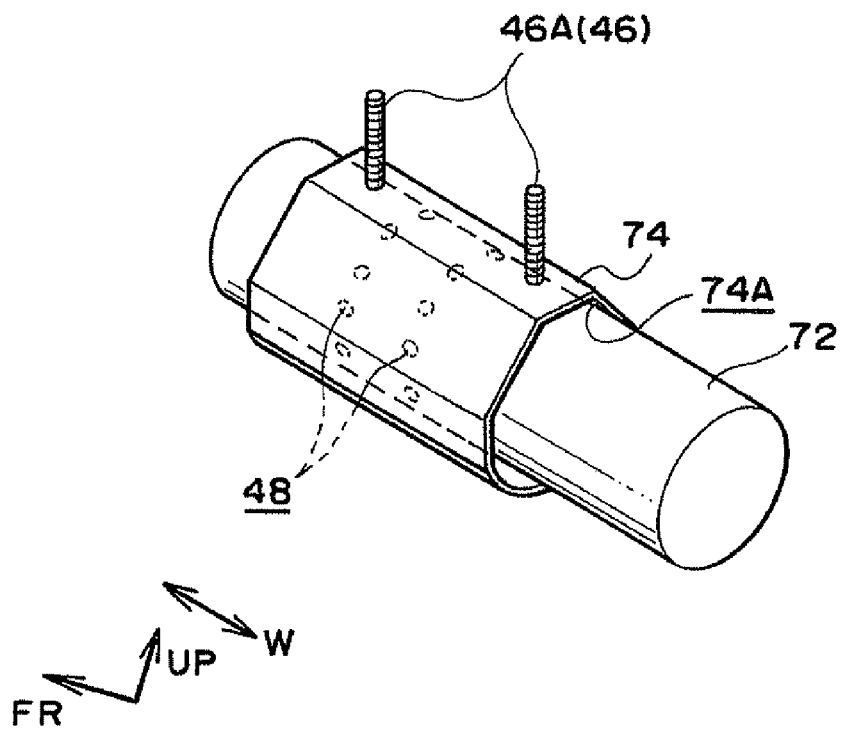
FIG. 8A is a perspective view showing an inflator and a diffuser of a column-mounted knee airbag device according to the third exemplary embodiment of the present invention.
Figure 8B:
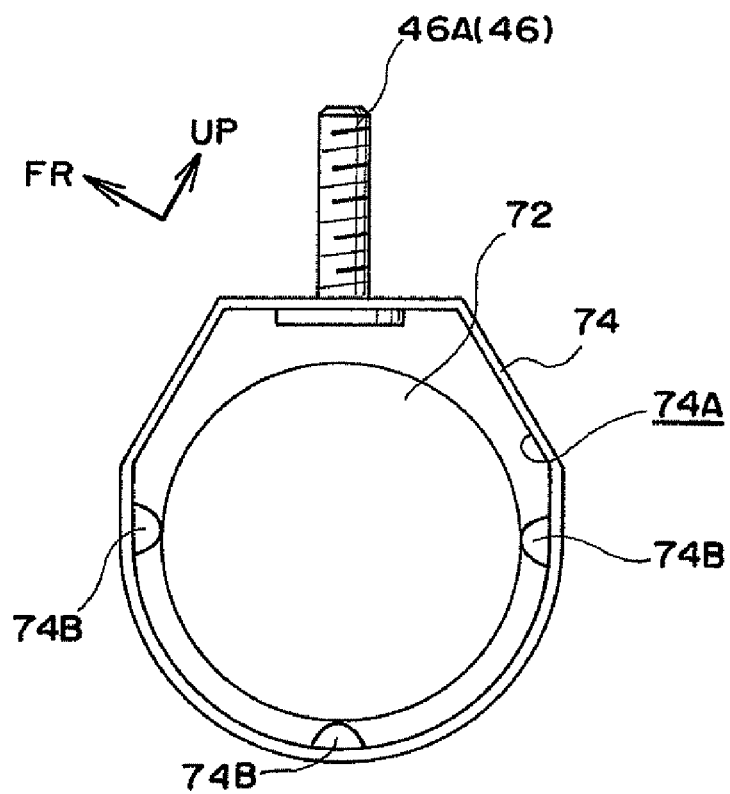
FIG. 8B is a side view showing an inflator and a diffuser of a column-mounted knee airbag device according to the third exemplary embodiment of the present invention.

Specifically, as shown in FIGS. 8A and 8B, the outer peripheral side of a portion of the inflator 72, including the locations disposed with the gas ejection holes 48 opened in the outer peripheral face of the inflator 72, is covered by a diffuser 74 serving as a flow adjusting member formed in a cylindrical shape. Namely, the diffuser 74 covers the gas ejection holes 48 (the entire area where the gas ejection holes 48 are disposed) of the disposed locations thereof) that are formed at one end side in the longitudinal direction of the inflator 72, and both ends of the diffuser 74 in the vehicle width direction are open ends 74A. The column-mounted knee airbag device 70 is thereby configured such that the gas ejected from the gas ejection holes 48 is adjusted in flow by the diffuser 74 so as to flow along the vehicle width direction, and is ejected from the open ends 74A at the left and right respectively.

The knee airbag 42 accommodates the inflator 72 and the diffuser 74 in their entirety, and gas supplied by the inflator 72 from the open ends 74A of the diffuser 74 inflates and deploys the knee airbag 42. Consequently, each of the open ends 74A of the diffuser 74 correspond to the gas supply opening of the present invention. It should be noted that as shown in FIG. 8B, stud bolts 46A, configuring the fastening means 46, are provided to the diffuser 74. The diffuser 74 is provided with crimped portions 74B at plural locations around the circumference of the diffuser 74, the crimped portions 74B making contact with the outer periphery of the inflator 72. The diffuser 74 is fixed to the inflator 72 by the crimped portions 74B. Other parts of the configuration of the column-mounted knee airbag device 70 are the same as the corresponding parts of the configuration of the column-mounted knee airbag device 10.

Consequently, fundamentally the same effects can also be obtained by with the column-mounted knee airbag device 70 according to the third exemplary embodiment, by operation in a similar manner to that of the column-mounted knee airbag device 10 according to the first exemplary embodiment.

Figure 9A:
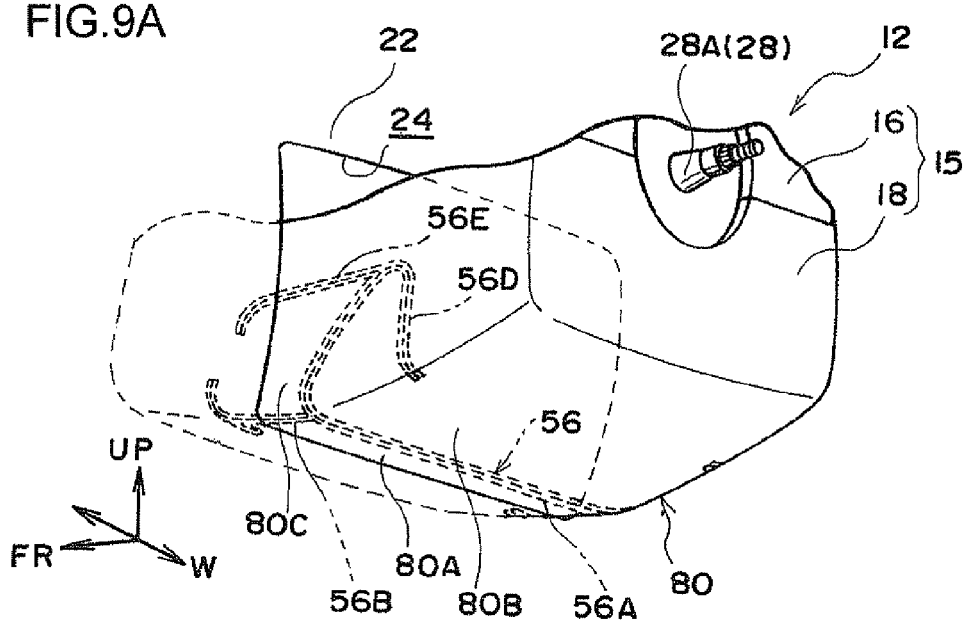
FIG. 9A is perspective view of an exemplary modification of an airbag door configuring a column-mounted knee airbag device according to each of the exemplary embodiments of the present invention.
Figure 9B:
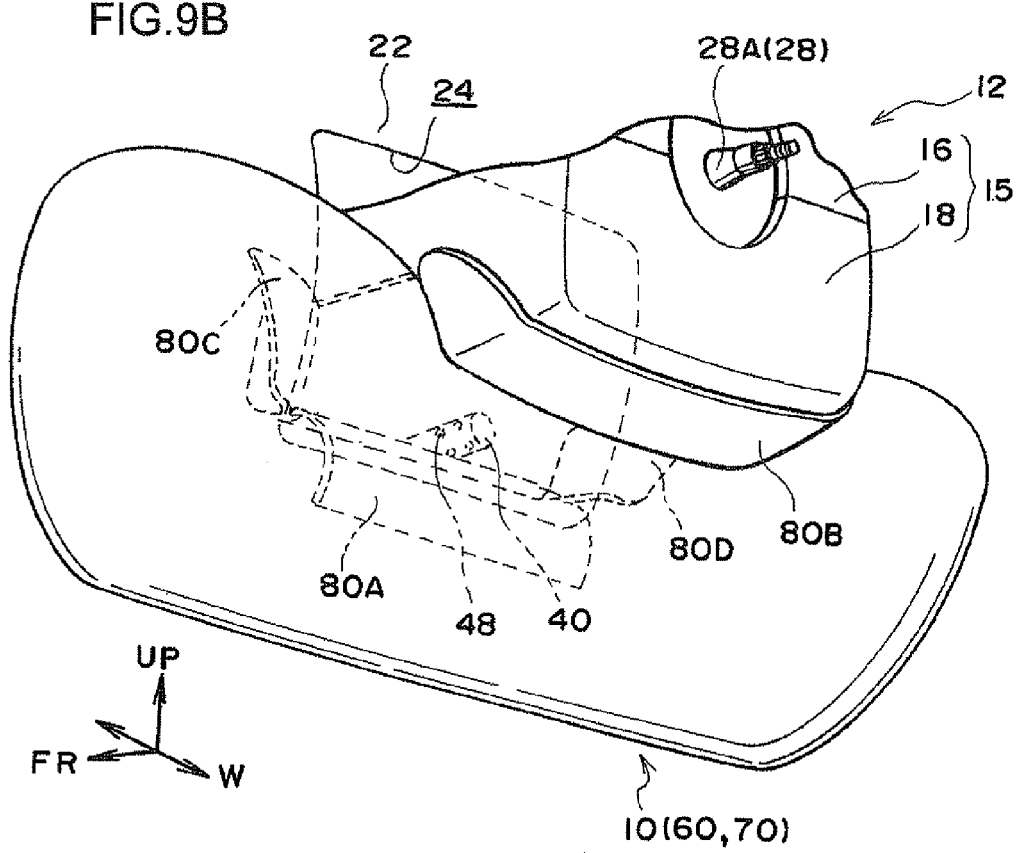
FIG. 9B is perspective view of an exemplary modification of an airbag door configuring a column-mounted knee airbag device according to each of the exemplary embodiments of the present invention.

It should be noted that while in each of the above exemplary embodiments examples given have been equipped with the airbag door 38 configuration, present invention is not limited thereto. For example, configuration may be made equipped with an airbag door 80 according to a preferable exemplary modification, as shown in FIGS. 9A and 9B. The airbag door 80 has a front door portion 80A, a left door portion 80C, and a right door portion 80D configured substantially the same as the front door portion 38A, the left door portion 38C, and the right door portion 38D. The airbag door 80, however, has a rear door portion 80B that deploys by folding back below the column lower cover 18 substantially towards the rear. The rear door portion 80B of the airbag door 80 can be configured without provision of the second vehicle width line 56C, by forming a side inverted-U-shaped line 56D and symmetrical side inverted-U-shaped line in portions of the side walls of the column lower cover 18. In such a configuration the rear door portion 80B opens with a portion between the front bottom ends of the left and right side inverted-U-shaped lines 56D (the portion corresponding to the disposed position of the second vehicle width line 56C) acting as a hinge.

The airbag door in the present invention is not also not limited to the four-part structures of the airbag doors 38, 80. Consequently structures of a different number of parts, for example such as a six-part structure or the like, may be adopted. Also, for example, configuration may be made with a cover of a separate body covering a hole formed in the column lower cover 18, instead of the structure in which the column lower cover 18 is integrally formed. It should be noted that, independent of which airbag door embodiment is adopted, configuration is preferably made with a door portion opening at the rear side of the decorative surface 22A of the instrument panel 22, in the vehicle front-rear direction, like the rear door portion 38B.

The invention claimed is:

1. A column-mounted knee airbag device comprising:
 a knee airbag configured to protect knees of a driver, the knee airbag being folded inside a column cover that covers a steering column having a telescopic function, the knee airbag opening an airbag door provided in the column cover by deployment pressure when supplied with gas and deploying between an instrument panel and the knees of the driver;
 an inflator installed at the inside of the column cover, the inflator being actuated and generating gas when a vehicle impact is detected or predicted; and
 a gas supply opening that supplies gas from the inflator to the knee airbag;
 wherein the gas supply opening and the knee airbag are disposed such that; in a state where the steering column is positioned furthest to the front in the vehicle front-rear direction due to the telescopic function, the gas supply opening is disposed in a position that is rearward of the instrument panel and a portion of the knee airbag inside the column cover is disposed in a position further to the front than the instrument panel, in the vehicle front-rear direction, respectively.

2. The column-mounted knee airbag device of claim 1, wherein the gas supply opening is disposed inside the knee airbag such that gas is ejected toward both sides in the vehicle width direction.

3. The column-mounted knee airbag device of claim 2, wherein:
 the longitudinal direction of the inflator is along the vehicle front-rear direction; and
 the gas supply opening is a gas ejection hole provided at a rear end portion of the inflator in the vehicle front-rear direction, opening toward the vehicle width direction.

4. The column-mounted knee airbag device of claim 3, wherein:
 the knee airbag has a pair of upper and lower straps for restricting the thickness of the knee airbag in the vehicle front-rear direction when in the deployed state; and
 the gas supply opening is disposed inside the knee airbag between the pair of straps so as to be in the vicinity of the upper strap of the pair of straps when the knee airbag is in the deployed state.

5. The column-mounted knee airbag device of claim 2, wherein:
 the longitudinal direction of the inflator is along the vehicle front-rear direction and a gas ejection hole is provided at a front end side of the inflator in the vehicle front-rear direction;
 a diffuser for guiding gas from the gas ejection hole to the knee airbag is fixed to the inflator; and
 the gas supply opening is a gas supply hole provided at a rear end portion of the diffuser in the vehicle front-rear direction, opening toward the vehicle width direction.

6. The column-mounted knee airbag device of claim 5, wherein the diffuser covers the inflator from an outer peripheral side so as to guide gas from the gas ejection hole to the gas supply hole through a space formed between the diffuser and an outer peripheral face of the inflator.

7. The column-mounted knee airbag device of claim 6, wherein:
 the knee airbag has a pair of upper and lower straps for restricting the thickness of the knee airbag in the vehicle front-rear direction when in the deployed state; and
 the gas supply opening is disposed inside the knee airbag between the pair of straps so as to be in the vicinity of the upper strap of the pair of straps when the knee airbag is in the deployed state.

8. The column-mounted knee airbag device of claim 5, wherein:
 the knee airbag has a pair of upper and lower straps for restricting the thickness of the knee airbag in the vehicle front-rear direction when in the deployed state; and
 the gas supply opening is disposed inside the knee airbag between the pair of straps so as to be in the vicinity of the upper strap of the pair of straps when the knee airbag is in the deployed state.

9. The column-mounted knee airbag device of claim 2, wherein:
 the longitudinal direction of the inflator is along the vehicle width direction, a gas ejection hole is opened in an outer peripheral face of the inflator and the inflator is covered from the outer peripheral side by a diffuser for guiding gas from the gas ejection hole to the knee airbag; and the gas supply openings are open ends formed at both sides in the vehicle width direction of a space between an inner peripheral face of the diffuser and the outer peripheral face of the inflator.

10. The column-mounted knee airbag device of claim 9, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

11. The column-mounted knee airbag device of claim 2, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

12. The column-mounted knee airbag device of claim 1, wherein:
   the longitudinal direction of the inflator is along the vehicle front-rear direction; and
the gas supply opening is a gas ejection hole provided at a rear end portion of the inflator in the vehicle front-rear direction, opening toward the vehicle width direction.

13. The column-mounted knee airbag device of claim 12, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

14. The column-mounted knee airbag device of claim 1, wherein:
   the longitudinal direction of the inflator is along the vehicle front-rear direction and a gas ejection hole is provided at a front end side of the inflator in the vehicle front-rear direction;
   a diffuser for guiding gas from the gas ejection hole to the knee airbag is fixed to the inflator; and
   the gas supply opening is a gas supply hole provided at a rear end portion of the diffuser in the vehicle front-rear direction, opening toward the vehicle width direction.

15. The column-mounted knee airbag device of claim 14, wherein the diffuser covers the inflator from an outer peripheral side so as to guide gas from the gas ejection hole to the gas supply hole through a space formed between the diffuser and an outer peripheral face of the inflator.

16. The column-mounted knee airbag device of claim 15, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

17. The column-mounted knee airbag device of claim 14, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

18. The column-mounted knee airbag device of claim 1, wherein:
   the longitudinal direction of the inflator is along the vehicle width direction, a gas ejection hole is opened in an outer peripheral face of the inflator and the inflator is covered from the outer peripheral side by a diffuser for guiding gas from the gas ejection hole to the knee airbag; and
   the gas supply openings are open ends formed at both sides in the vehicle width direction of a space between an inner peripheral face of the diffuser and the outer peripheral face of the inflator.

19. The column-mounted knee airbag device of claim 18, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

20. The column-mounted knee airbag device of claim 1, wherein:
   the knee airbag has a pair of upper and lower straps for restricting the thickness of the knee airbag in the vehicle front-rear direction when in the deployed state; and
   the gas supply opening is disposed inside the knee airbag between the pair of straps so as to be in the vicinity of the upper strap of the pair of straps when the knee airbag is in the deployed state.

* * * * *